US005552935A

United States Patent [19]

Knoll et al.

[11] Patent Number: 5,552,935

[45] Date of Patent: Sep. 3, 1996

[54] HEAD-UP DISPLAY DEVICE FOR MOTOR VEHICLES

[75] Inventors: Peter Knoll, Ettlingen; Winfried König, Pfinztal-Berghausen; Rüdiger Mock-Hecker, Neu-Ulm, all of Germany

[73] Assignee: Robert Bosch GmbH, Stuttgart, Germany

[21] Appl. No.: 646,758

[22] PCT Filed: May 21, 1989

[86] PCT No.: PCT/DE89/00348

§ 371 Date: Jan. 2, 1991

§ 102(e) Date: Jan. 2, 1991

[87] PCT Pub. No.: WO90/00262

PCT Pub. Date: Jan. 11, 1990

[30] Foreign Application Priority Data

Jul. 1, 1988 [DE] Germany .......................... 38 22 222.1

[51] Int. Cl.[6] .................................................... G02B 27/14

[52] U.S. Cl. ......................... 359/630; 359/629; 359/619; 359/13; 359/15

[58] Field of Search ................................ 359/13, 15, 19, 359/619, 629, 630, 483

[56] References Cited

U.S. PATENT DOCUMENTS

| | | | |
|---|---|---|---|
| 3,216,308 | 11/1965 | Northcutt | 88/1 |
| 3,887,273 | 6/1975 | Griffiths | 353/14 |
| 3,915,548 | 10/1975 | Opittek et al. | 350/174 |
| 4,190,832 | 2/1980 | Mohler | 359/48 |
| 4,799,765 | 1/1989 | Ferrer | 350/162.23 |
| 4,892,386 | 1/1990 | Suzuki et al. | 350/174 |
| 4,900,133 | 2/1990 | Berman | 350/174 |
| 4,955,698 | 9/1990 | Knoll et al. | 359/630 X |
| 4,961,625 | 10/1990 | Wood et al. | 359/630 |
| 4,981,332 | 1/1991 | Smith | 359/13 |
| 4,989,956 | 2/1991 | Wu et al. | 350/345 |
| 5,044,709 | 9/1991 | Smith et al. | 359/630 |

FOREIGN PATENT DOCUMENTS

| | | | |
|---|---|---|---|
| 0177134 | 4/1986 | European Pat. Off. | 359/630 X |
| 2519308 | 11/1975 | Germany | 359/630 X |
| 3347271 | 7/1985 | Germany | 359/630 X |
| 6088925 | 10/1986 | Japan | 359/630 X |
| 61-238015 | 10/1986 | Japan | 359/630 X |
| 1321303 | 6/1973 | United Kingdom | 359/630 X |

OTHER PUBLICATIONS

WPI Abstract of DE-05 33 47 271 Wiesmeier & Reiniger/Daimler-Benz AG (No date of publication).

*Primary Examiner*—Brian Healy
*Attorney, Agent, or Firm*—Frishauf, Holtz, Goodman, Langer & Chick, P.C.

[57] ABSTRACT

Head-up displays on motor vehicles often have double images and interfering reflections on the windshield. To avoid these, arrangements of linear polarization filters or shutter foils are suggested, which have particularly high light transmission. Arrangements of filter plates on a combiner inside of the windshield are also advantageous.

10 Claims, 3 Drawing Sheets

HEAD-UP DISPLAY DEVICE FOR MOTOR VEHICLES

FIELD OF THE INVENTION

The invention relates to an optical device for reflecting data in the form of displays into the field of vision of the driver of a motor vehicle.

BACKGROUND

There are many suggestions for displaying relevant data to the driver of a motor vehicle by means of a head-up display (HUD). Measured data and warning signals of importance for the driver are reflected onto a portion of the windshield which lies within the field of vision of the driver. This enables the driver to recognize data, such as speed, safe brake operation or traffic information, even if his attention is directed to the traffic situation and without having to remove his eyes from the road. The need for distance adjustment by the eyes of the driver is eliminated to a large extent.

Head-up displays require a partially transparent mirror for superimposition of the virtual image generated by the data elements on the image of the environment. A reflection on the windshield or on an additional plate (combiner) placed inside of the windshield can be used for this in a motor vehicle. In both cases reflections appear at the planes of separation between the windshield or the combiner plate and the air, which result in undesirable double images and in this way considerably impair the legibility of the data. The entry of light into the optical space of the HUD results in reflections which are also blended into the field of vision of the driver. A bright, fog-like background surface appears for the driver, which hampers the view of the traffic situation. To suppress these effects, coating of the inner boundary surface with the dielectric layer is generally suggested, by means of which one of the reflected images is enhanced and the other attenuated.

It is furthermore known to design the reflecting layers in such a way that they only reflect light of the wavelength given off by the indicator elements disposed within the dashboard. The effect of ambient light can be reduced thereby.

It is furthermore known from German Patent DE-PS 33 47 271 to polarize the luminous flux and to deflect it in the direction of the driver from a multiple coating with different refractive indices applied to the windshield, taking the Brewster angle into consideration. The application of dielectric coatings by vacuum evaporation or sputtering in high vacuum, in particular on the windshield, is very expensive. It is known that these coatings are also very sensitive to scratches and dirt, so that the legibility of the displays is impaired.

THE INVENTION

Briefly in accordance with the invention polarization filters are used, which are simple and inexpensive to manufacture and provide a good contrast of the displays on the windshield. It is also an advantage that they are scratchproof and can be easily replaced in case of possible damage. Advantageously, the transmission of light in the direction of the road is only minimally hampered by the use of shutters.

The use of a second shutter in the luminous flux is particularly advantageous, because interfering scattered light is stopped down to the greatest extent possible. Disposition of the filter plates on a pivotable combiner inside of the windshield is advantageous, if it is intended to make the angle of vision and brightness of the displays variable. The virtual image can also be adjusted for drivers of different height by pivoting the combiner, so that in an advantageous manner maximum contrast is always achieved within the Brewster angle. It is also advantageous to combine, preferably transparent, liquid crystal displays with the virtual image on the combiner, because by means of this, important vehicle data, which can be displayed very clearly together with traffic information, such as engine or vehicle speed, can be reflected with a high degree of contrast into the field of vision of the driver.

A further advantage is that because of their thin walls the filter foils or plates can be very easily embedded inside the windshield in connection with composite glass without noticeable distracting reflections. This provides particularly good protection against mechanical damage. Also, the placement of the displays in the field of vision on the hood is advantageous, because the view of the road is not hampered by this, while adjustment by the eyes is avoided to a large degree. By changing the reflection angle at the combiner or the brightness of the illumination it is furthermore possible to adapt the virtual image of the displays in an advantageous manner to ambient light conditions, by means of which blinding of the driver is prevented, particularly at night.

DRAWINGS

Exemplary embodiments of the invention are shown in the drawings and described in detail in the description below. Shown are in FIG. 1 the reflecting beams of the virtual images on the untreated windshield;

FIG. 2 a first exemplary embodiment;

FIG. 3 a second exemplary embodiment;

DESCRIPTION OF THE EXEMPLARY EMBODIMENTS

Figure 1:
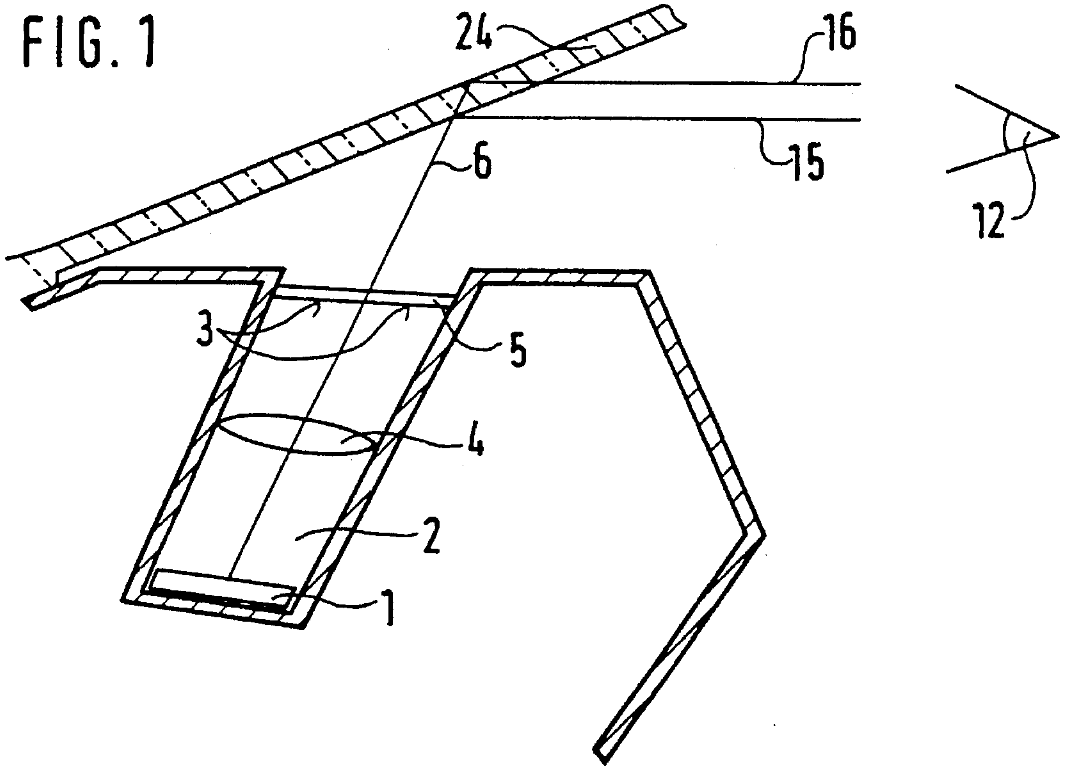
Figure 2:
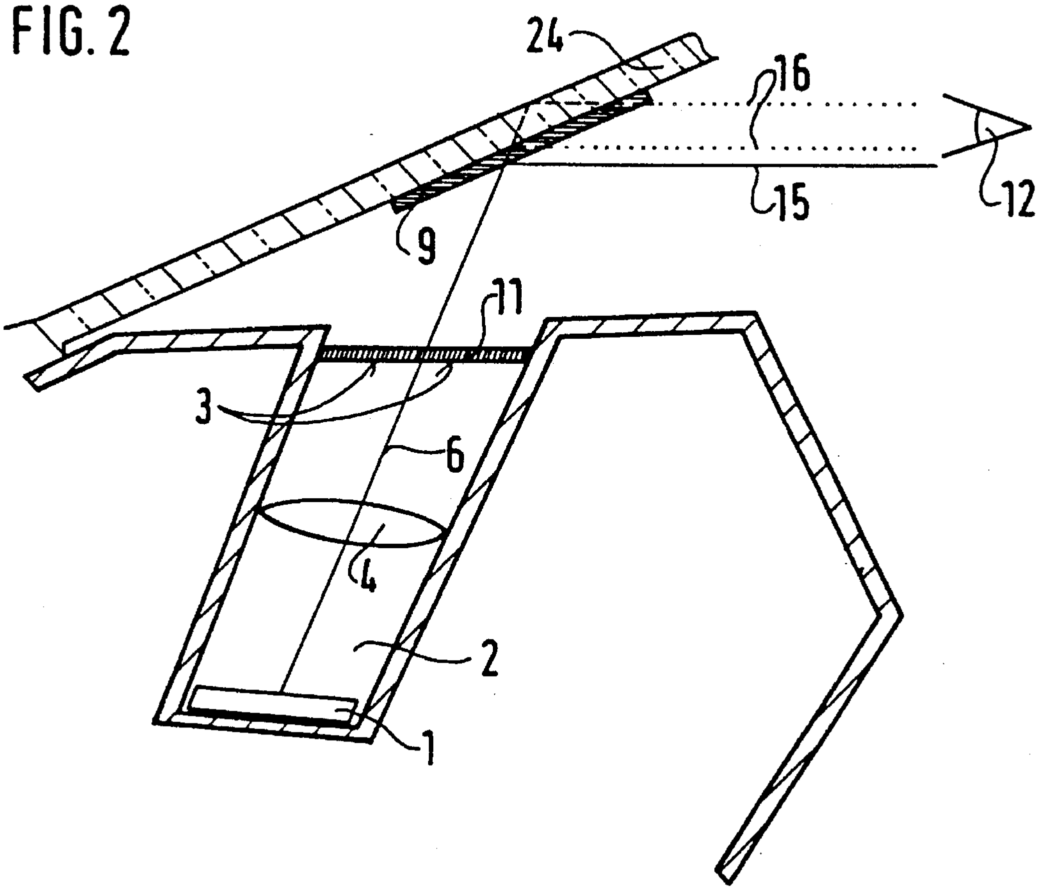

FIG. 1 shows a known optical device in which the luminous flux 6 is generated by the display elements 1 and focused the optical device 4. It impinges on the windshield 24, where it is reflected on the inside surface as well as the outside surface of the windshield. Because of the thickness of the windshield, an observer seated in about the position 12 sees two offset, approximately equally bright virtual images on the windshield 24, which are superimposed on the view of the road. Since scattered light from the outside may also enter the observed space, clear reading of the display is made very difficult for the observer. In accordance with a feature of the invention, and to avoid these disruptive effects, a first polarization filter 11 (FIG. 2) is inserted into the outlet opening 3, which linearly polarizes the luminous flux 6. Furthermore, a second polarization filter 9 is applied to the inside of the windshield 24. Its direction of polarization extends perpendicularly to that of the first polarization filter 11. A portion of the luminous flux 6 is now deflected towards the driver by the side of the second polarization filter 9 facing the driver; he sees the virtual image of the display elements 1. Preferably, the filter 9 is located at the Brewster angle with respect to the light flux 6. The portion of the luminous flux 6 not reflected on the surface of the second polarization filter 9 is absorbed to a large part in the crossed second polarization filter 9. The reduced image is identified by the dotted line 16, while the primary image is indicated by the luminous flux 15. By moving the optical device 4 in the well 2, the image distance (virtual distance) of the display elements 1 can be set. By means of this, the driver is capable of adapting the display image to the viewing conditions on the road. A brightness adjustment, not shown, is also provided, which permits manual or automatic adjustment of the brightness of the display to prevent glare, or blinding in particular during darkness. Preferably the second polarization filter 9 is disposed in the lower portion of the windshield which essentially is located in the vision field towards the hood of the vehicle. Detracting interferences with the view of the road are thereby avoided.

Figure 3:
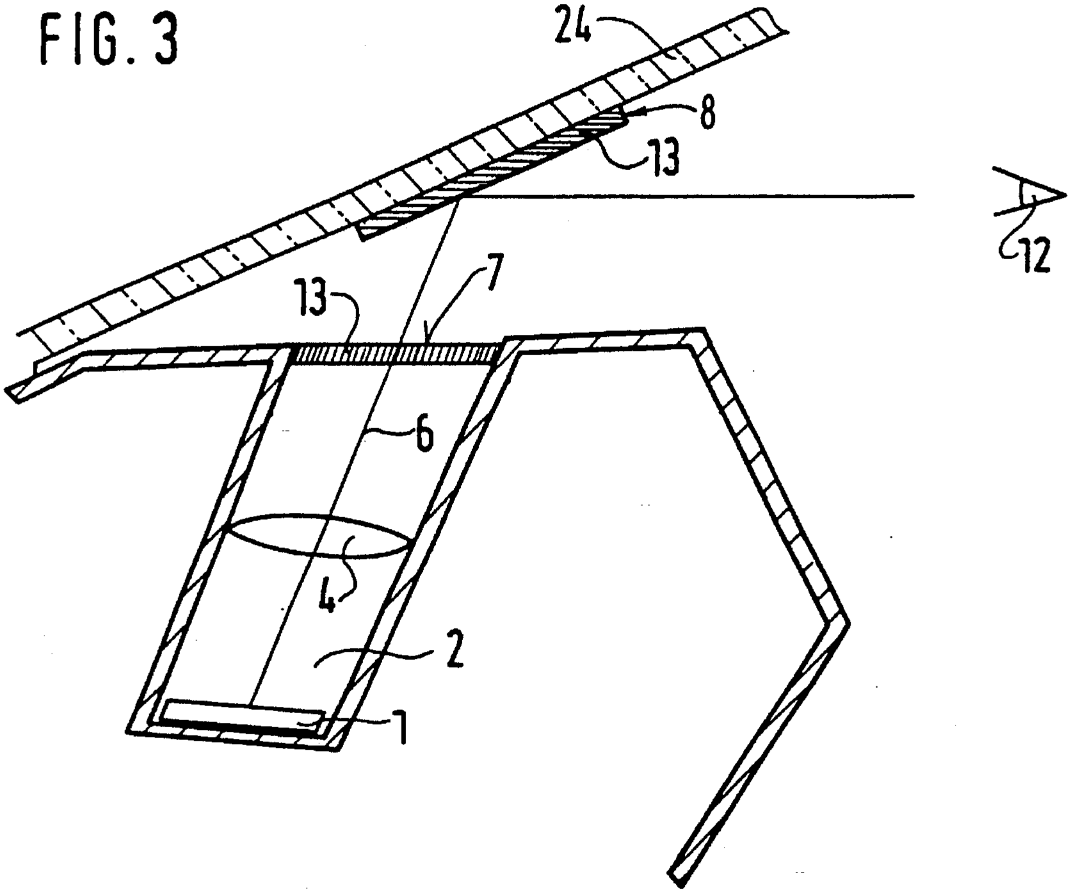
Figure 5:
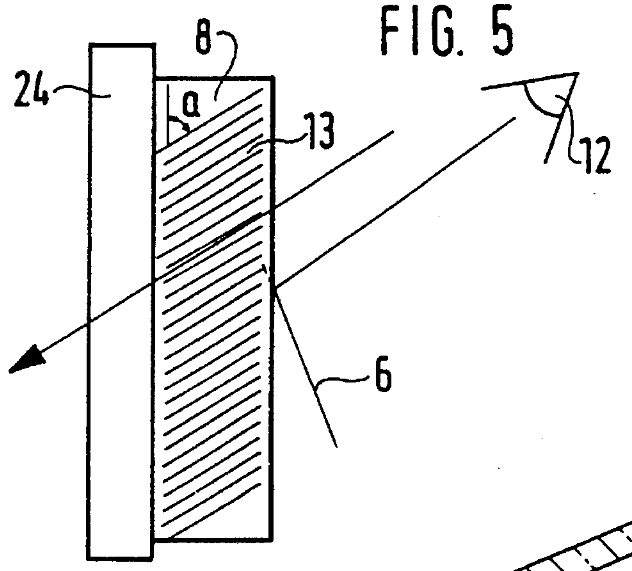
FIG. 5 shows the operation of the shutter.

A second exemplary embodiment is shown in FIG. 3. Slatted shutters 7, 8 have been employed in this case, instead of the polarization filters. The shutters 7, 8 have parallel disposed reflectors which let the impinging light through or stop it, depending on the angle of incidence. The shutter 8, fixed on the inside of the windshield 24, is aligned in such a way that the impinging luminous flux 6 is partially deflected on its surface towards the driver. The function of this reflector plate is illustrated in FIG. 5. The reflectors 13 are disposed such that the remaining portion of the luminous flux 6 is completely absorbed and no double image is therefore generated. Thus only the reflection generated on the plane of separation between the air and the foil is utilized. On the other hand, the view of the observer 12 through the shutter 8 is only slightly hampered, because the shutter 8 has a high degree of transmission at this viewing angle. The second shutter 7 is disposed in the outlet of the light well 2 to avoid unwanted reflections from the optical space of the HUD. Here the reflectors are disposed parallel to the luminous flux 6, so that the luminous flux 6 can pass through practically unhindered. With suitable inclination of the windshield 24 with the first shutter 8 it is possible to avoid using the second shutter 7, because the interfering reflections based on light falling into the optical space cannot occur. The slatted shutters can also be embedded in an intermediate layer of the windshield 24 to prevent scratching of the foils.

Figure 4:
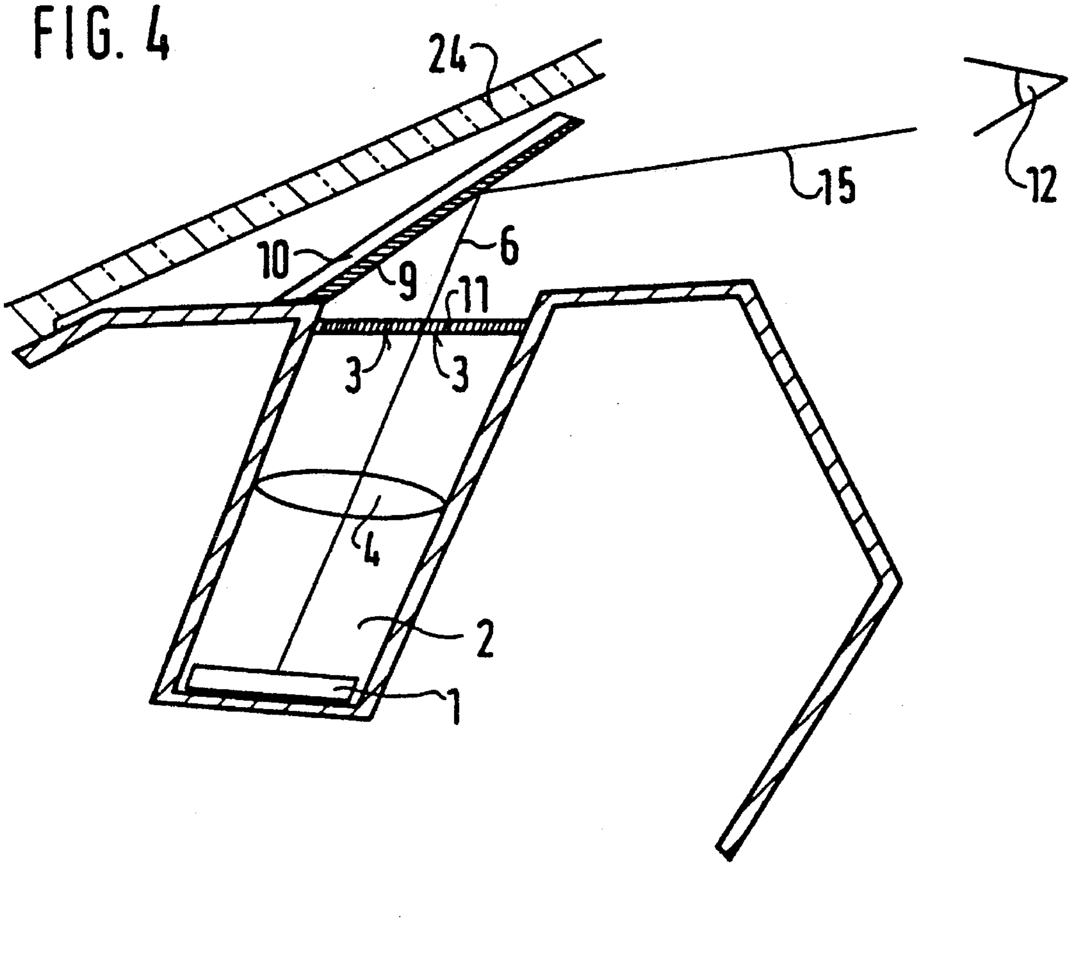
FIG. 4 shows a third exemplary embodiment.

A third exemplary embodiment of the invention is shown in FIG. 4. In this case a transparent plate in the form of a combiner 10 has been provided inside of the windshield 24 at the outlet of the well 3. Either the second polarization filter 9 of the first exemplary embodiment or the slotted shutter 8 is disposed on the side of the combiner 10 facing the driver. The well cover 11 with a polarization filter or a shutter is used accordingly. The functioning of this exemplary embodiment is the same as in the ones previously mentioned. However, in a further embodiment of the invention the combiner is pivotably located, so that the position of the virtual image on the combiner 10 can be individually selected independent of the inclination angle of the windshield 24. When the combiner 10 has been set at the Brewster angle in respect to the luminous flux 6, it receives maximum light intensity. The position of the windshield and the aerodynamic effects on the chassis connected therewith need to be considered when a combiner is provided. Further explanation is not necessary, because the functioning is the same as in the first exemplary embodiment.

Figure 6:
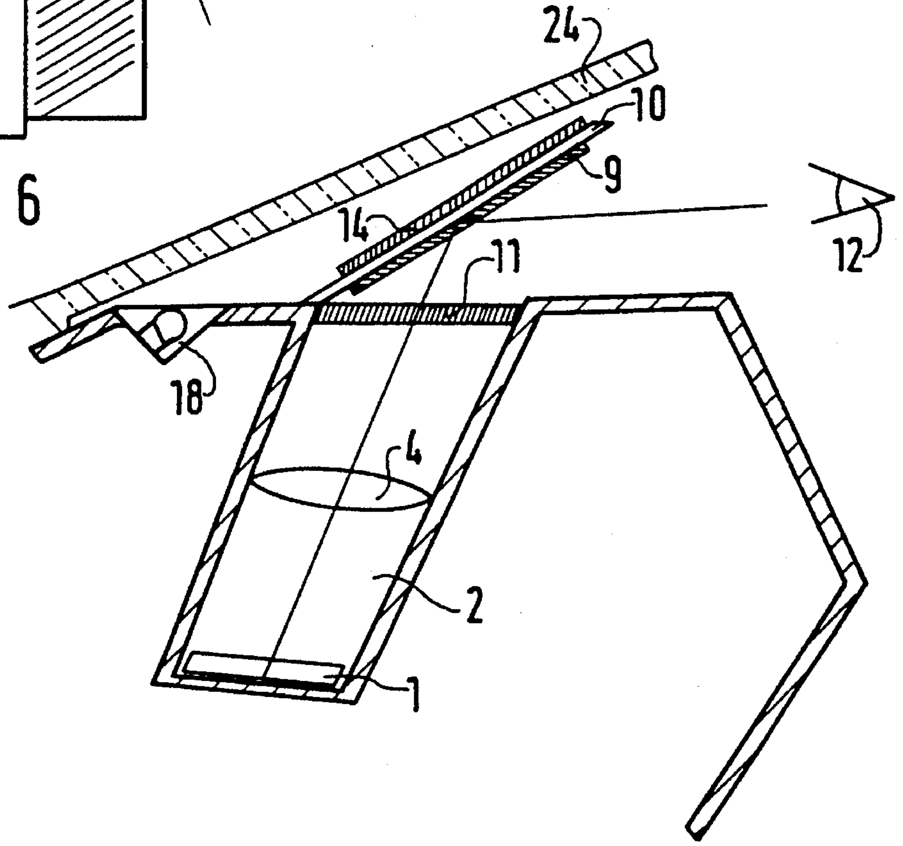
FIG. 6 shows a combined display with two liquid crystal displays.
Figure 7:
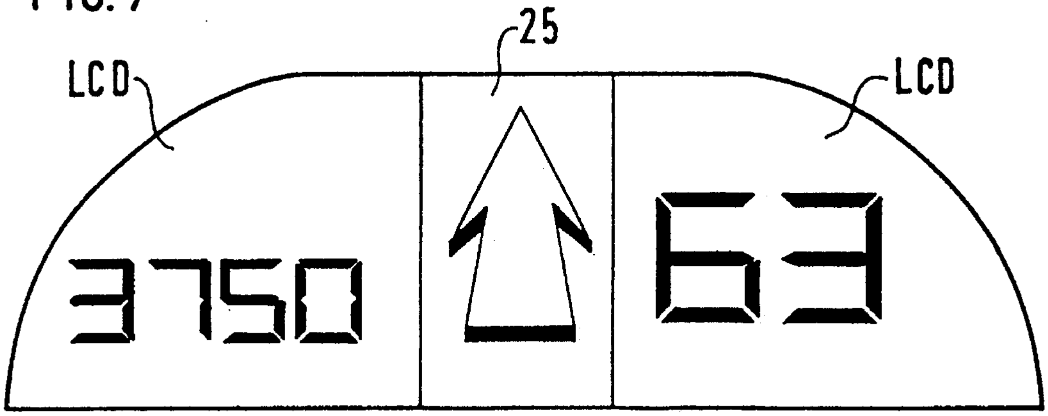
FIG. 7 shows the structure of the combined display in section.

A further exemplary embodiment is shown in FIGS. 6 and 7, having a combination of a field with a virtual image and two laterally disposed liquid crystal displays LCD on a common combiner 10. As in the third exemplary embodiment in accordance with FIG. 4, the field 25 with the virtual image is supplied with the second polarization filter 9 on the side (front) of the combiner 10 facing the observer 12. Preferably the second polarization filter 9 is laid over the entire front of the combiner 10. Transparent liquid crystal displays LCD, for example to indicate the engine speed in rpm and vehicle speed, are preferably provided between the second polarization filter 9 and the combiner 10 laterally next to the field with the virtual image. It is, of course, also possible to integrate other indications such as oil pressure, time, or traffic information. The liquid crystal displays LCD preferably have dark or colored symbols. The required electrical supply lines are disposed on the liquid crystal displays at a non-interfering place.

On the side facing the windshield, the liquid crystal displays LCD are backed with a third polarization filter 14 to assure that the function of the liquid crystal display is obtained. To absorb interfering light reflections to the greatest possible extent, the polarization direction of the second polarization filter 9 is preferably aligned approximately perpendicularly with respect to the polarization filter 11. The liquid crystal displays LCD are provided with a controllable lighting device 18 which may be disposed, for example, in the space between the windshield 24 and the combiner 10.

Functioning of this arrangement is as follows: for example, the field with the virtual image displays traffic information for the driver, as already described in accordance with the first exemplary embodiment; two additional electrically operated liquid crystal displays LCD are provided which indicate, for example, engine speed in rpm and vehicle speed. However, other displays can also be provided, particularly if the liquid crystal displays (LCD) are provided with a memory. For example, with appropriate design of the liquid crystal displays LCD, road maps or city maps could be displayed.

We claim:

1. An optical device on a motor vehicle which has a windshield (24) for reflecting data in the form of displays, which are generated by display elements by means of a luminous flux in a well in the area of the instrument panel and are projected into the field of the vision of a driver of said vehicle via an optical device through an outlet opening of the well onto the windshield (24) of said vehicle and are reflected in this area by foils or plates, comprising a first linear polarization filter (11) disposed in the path of the rays of the luminous flux (6) in the area of the outlet opening (3);

a second linear polarization filter (9) disposed in the area of the inside of the windshield (24) and extending with its direction of polarization aligned approximately perpendicularly to the polarization of the first polarization filter (11); and wherein the second linear polarization filter (9) is disposed at the Brewster angle with respect to the path of the rays of the luminous flux (6).

2. An optical device in accordance with claim 1, further comprising a transparent combiner (10) located inside of the windshield wherein the second polarization filter (9) is disposed on the transparent combiner (10).

3. An optical device in accordance with claim 2, further comprising, a further display, located on the combiner (10), and having at least one liquid crystal display (LCD); and a third polarization filter (14) located between the liquid crystal display (LCD) and the windshield (24), in the area of the liquid crystal display (LCD).

4. An optical device in accordance with claim 2, wherein the angle of inclination of the combiner (10) is adjustable.

5. An optical device in accordance with claim 1, wherein the second polarization filter (9) is disposed in an intermediate layer of the windshield (24).

6. An optical device in accordance with claim 1, wherein the second polarization filter (9) is disposed in the lower area of the windshield (24).

7. An optical device in accordance with claim 1, wherein the brightness of the virtual image, on the second polarization filter (9), is adjustable.

8. An optical device in accordance with claim 3, further comprising, a lighting device (18) located in a space between the combiner (10) and the windshield (24) for illuminating said liquid crystal display (LCD).

9. An optical device in accordance with claim 3, wherein the angle of inclination of the combiner (10) is adjustable.

10. An optical device in accordance with claim 8, wherein the angle of inclination of the combiner (10) is adjustable.

* * * * *